United States Patent [19]
Duncan, Jr.

[11] 4,355,990
[45] Oct. 26, 1982

[54] TORSIONALLY ELASTIC POWER TRANSMITTING DEVICE

[75] Inventor: Jock S. Duncan, Jr., Parker, Colo.

[73] Assignee: The Gates Rubber Company, Denver, Colo.

[21] Appl. No.: 189,493

[22] Filed: Sep. 22, 1980

[51] Int. Cl.³ ............................................. F16H 55/14
[52] U.S. Cl. .......................................... 474/94; 464/74
[58] Field of Search .................. 474/94; 64/11 R, 14, 64/27; 192/84 A

[56] References Cited

U.S. PATENT DOCUMENTS

| | | | |
|---|---|---|---|
| 480,439 | 8/1892 | Seaton | 64/14 X |
| 1,479,755 | 1/1924 | Stokes | 64/13 |
| 2,025,826 | 12/1935 | Ricefield | 64/14 |
| 2,267,904 | 12/1941 | Evans | 64/14 |
| 2,873,590 | 2/1959 | Croset | 64/14 |
| 3,216,267 | 11/1965 | Dolza | 474/94 |
| 3,314,512 | 4/1967 | Kerestury | 64/14 X |

Primary Examiner—Nile C. Byers, Jr.
Attorney, Agent, or Firm—Curtis H. Castleman, Jr.; H. W. Oberg, Jr.; Raymond Fink

[57] ABSTRACT

A torsionally elastic power transmitting device is described having respective rotatable hub and rim members coupled in torsional driving relation through resilient cushions. The improvement is directed to the radial bearing surface which is formed directly between the hub and rim members along their respective outer and inner peripheries.

9 Claims, 7 Drawing Figures

TORSIONALLY ELASTIC POWER TRANSMITTING DEVICE

BACKGROUND OF THE INVENTION

This invention relates to rotary driven members and more particularly to torsionally elastic power transmission assemblies capable of absorbing or isolating torsional shocks and vibrations in a power drive train.

Power transmitting devices are known which are capable of damping or isolating torsional shock loading and minimizing noise and vibration by the use of resilient cushioning means. Rubber cushions, for instance, are adapted to yieldingly transmit rotary motion between mating lugs of an integral hub and rim assembly. Typical applications include cushion sprockets for use with roller chain or synchronous belting, direct gear drives, torque transmission between shafts (flexible couplings), and in automotive accessory drives, for instance. Examples of the prior art include Croset U.S. Pat. No. 2,873,590, Kerestury U.S. Pat. No. 3,314,512 and Koppers Company "Holset Resilient Couplings" catalog, March, 1973.

These prior art devices have generally been provided with outer bearing plates attached respectively to the inner hub and outer rim members for carrying the radial bearing load. An additional example of this type of radial bearing design is shown in co-pending, commonly assigned U.S. Patent Application Ser. No. 900,459, filed Apr. 12, 1978.

It is a primary object to this invention to improve the radial bearing properties of a torsionally elastic power transmitting device, and more particularly to increase the radial bearing surface and attain self-alignment between the hub and rim members of the device. Especially for belt transmissions, it is an object to positively locate the torsionally elastic sheave or pulley concentrically about its centerline to maintain proper belt tension and to prolong belt life.

SUMMARY OF THE INVENTION

Briefly described, the invention pertains to a torsionally elastic power transmitting device rotatable about an axis, and having a hub member provided with at least two lugs, a rim member disposed outwardly of the hub provided with at least two ears matingly engaging the lugs in torsional driving relation, and resilient cushion spring means interposed between the ears and lugs to transmit power therebetween. The improvement is directed to the use of hub and rim members having along their respective outer and inner peripheries a plurality of juxtaposed radial bearing surfaces of substantial axial dimension, and in substantial mutual contact with one another. In use, there is thus provided a large radial bearing surface with the hub and rim members of the torsionally elastic device tending to automatically self-align and maintain concentricity.

BRIEF DESCRIPTION OF THE DRAWINGS

The invention in its preferred embodiments will be more particularly described by reference to the accompanying drawings, in which like parts are designated by like numerals in the various figures, and in which.

PREFERRED EMBODIMENTS OF THE INVENTION

Figure 1:
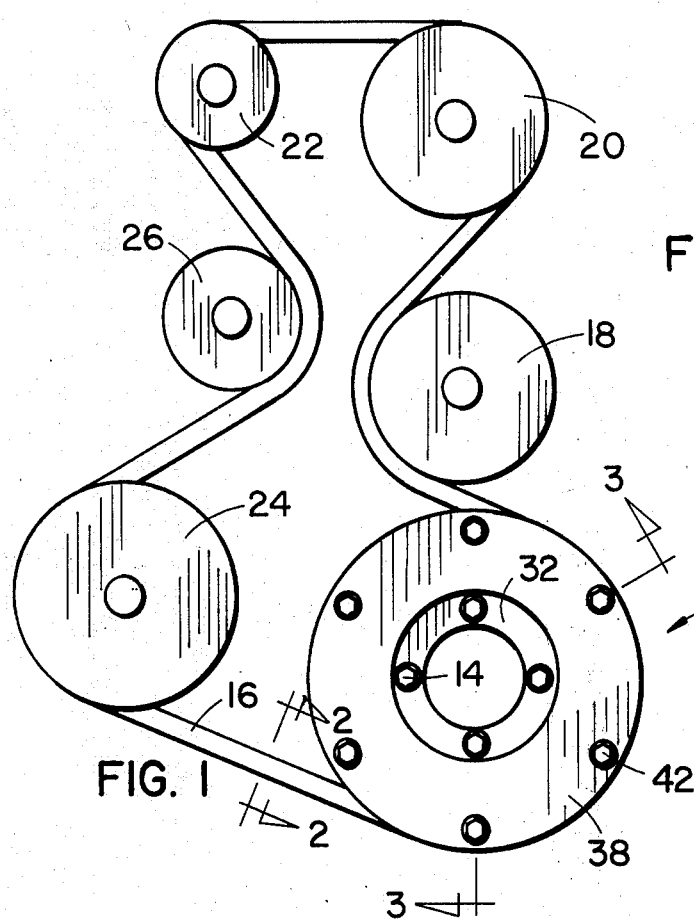
FIG. 1 is a schematic view of an accessory belt drive for an automobile using a torsionally elastic sheave in accordance with the invention.
Figure 2:
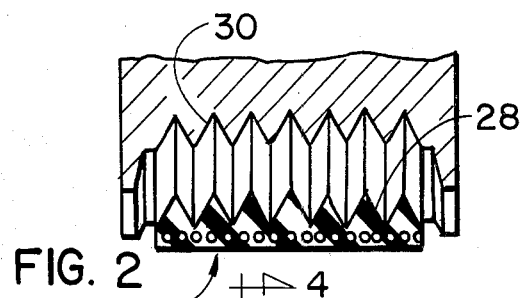
FIG. 2 is a partial sectional view along section 2—2 of FIG. 1.
Figure 3:
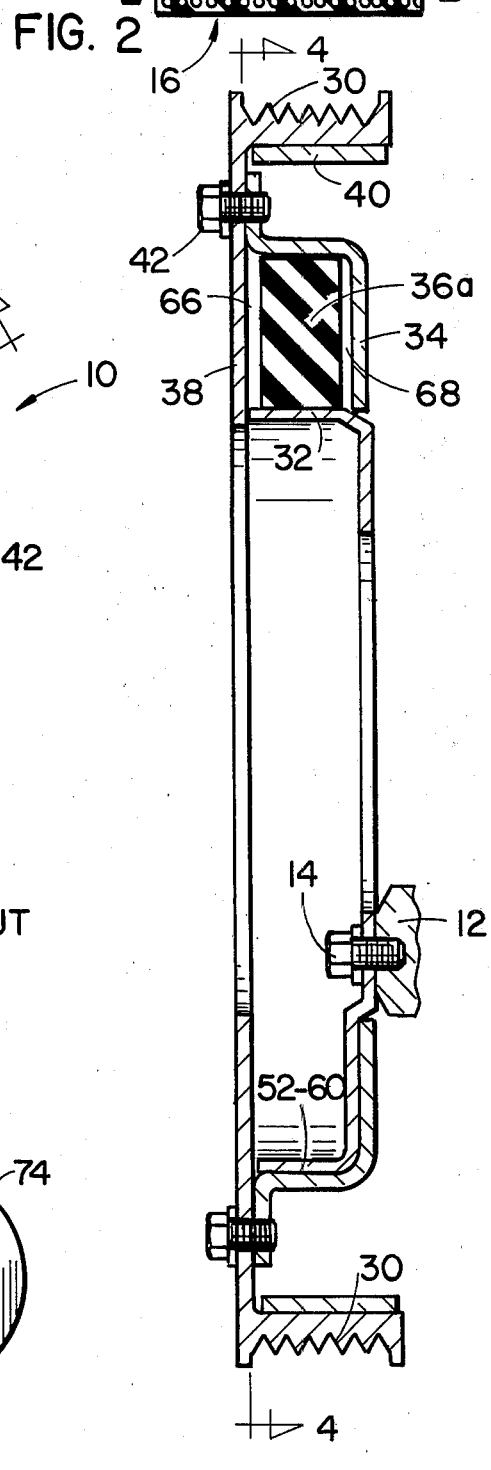
FIG. 3 is a sectional view of the sheave taken along section 3—3 of FIG. 1.

For illustrative purposes, referring first to FIGS. 1, 2 and 3, torsionally elastic sheave 10 of the invention is employed in a serpentine accessory drive for a transverse mounted diesel automobile engine. In this example, sheave 10 is coupled directly to the engine crankshaft harmonic balancer 12 (shown partially) with the aid of fasteners 14. Sheave 10 is linked in driving relationship through serpentine V-ribbed belt 16 to a backside water pump sheave 18 (to which an offtake belt, not shown, may couple a vacuum pump), air conditioning sheave 20, alternator sheave 22 and power steering sheave 24, and a tension applying backside idler 26. As shown more clearly in FIG. 2, belt 16 may be a typical reinforced endless power transmission belt of V-ribbed construction whose individual ribs 28 wedge into or make frictional contact with corresponding V-grooves 30 formed on the driving circumference of the sheave.

Figure 4:
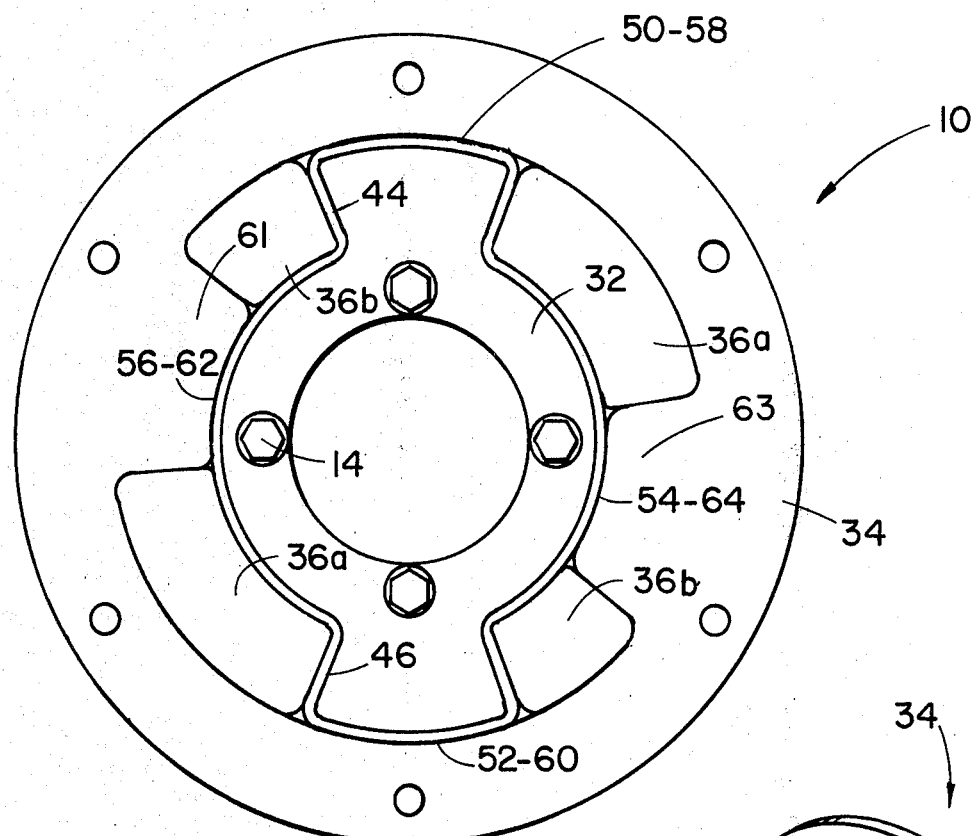
FIG. 4 is a view of the hub, rim and cushion members as seen along section 4—4 of FIG. 3.
Figure 5:
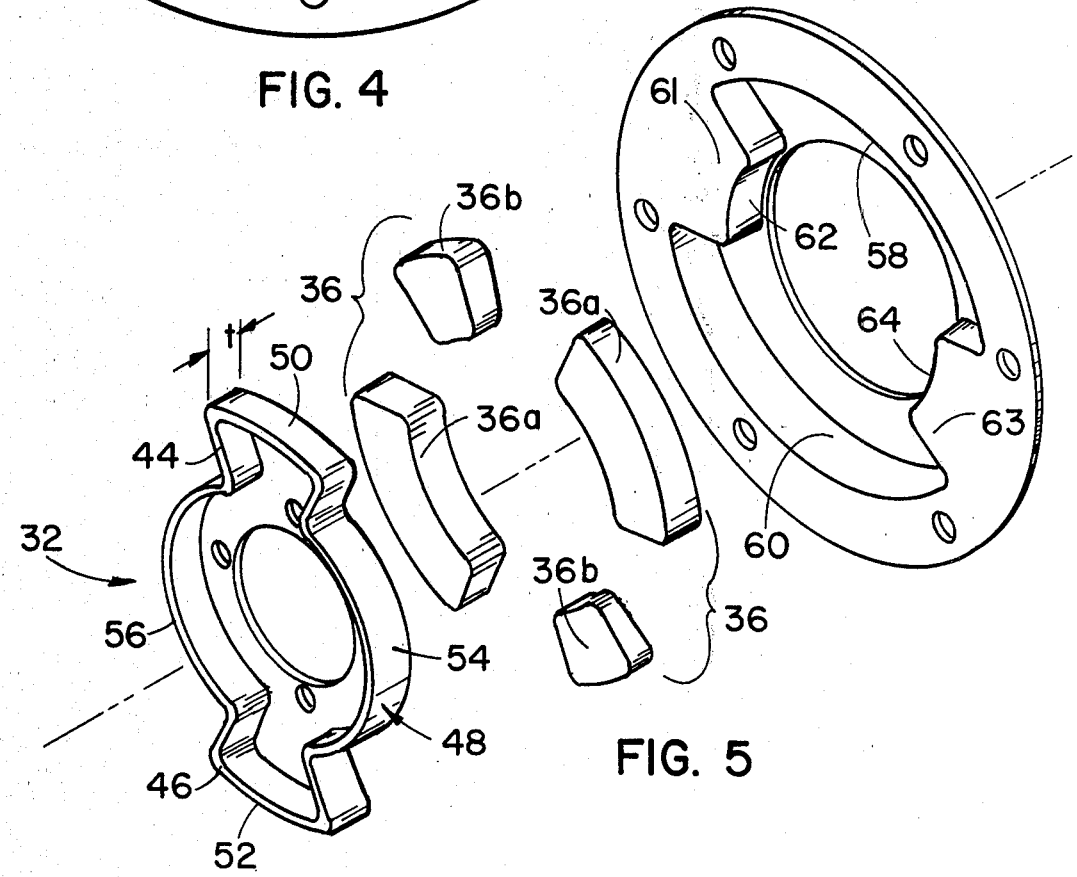
FIG. 5 is a perspective, exploded view of the components of the device of FIG. 4.

Referring to FIGS. 3–5, the torsionally elastic sheave of the invention is composed generally of (1) hub member 32, fastened to crankshaft harmonic balancer 12, (2) outer rim member 34, and (3) torque transmitting elastomeric cushion springs 36. These components are held together in assembly by cover face plate 38 which has a unitary flange formed with the belt engaging sheave surface 30. The sheave may in turn be supported by ring 40 for added strength. The cover face plate 38 is rigidly attached to rim member 34 e.g., by welding or with fasteners 42, to form an integral unit. The face plate 38 also extends sufficiently radially inwardly to hold the hub member 32 in position and form a thrust-bearing surface therewith.

Hub member 32 is provided with at least two driving lugs 44, 46. The outer periphery 48 of the hub serves, along a substantial marginal portion thereof, as a radial bearing surface in cooperation with corresponding inner peripheral portions of rim 34. The radial bearing surface is large due to the substantial thickness "t" of the hub together with a corresponding axial surface on the rim member, and by the fact that a plurality of peripheral portions 50, 52, 54, 56 of the hub make radial bearing surface contact with corresponding portions 58, 60, 64, 62 of the rim 34. Thus, the outermost peripheral portions 50, 52 of the lugs of the hub form radial bearing surfaces of relatively large areas with the inner peripheral surfaces 58, 60 of the cup-shaped rim member. Similarly, the innermost surface portion 62, 64 of ears 61, 63 of the rim member form additional radial bearing surface areas with surfaces 56, 54 of the hub.

While it is highly preferred to maximize the radial bearing surface by providing for each of the bearing surface pairs 50–58, 52–60, 56–62, and 54–64, whereby the respective peripheral portions of the hub and rim are in substantial mutual contact at each of these surfaces, it is possible, for instance, to provide clearance between an opposite pair of surfaces (e.g., providing clearance between surfaces 50 and 58 and 52 and 60) as long as the remaining bearing surfaces (56-62 and 54-64) are maintained.

As aforesaid, the substantial axial dimension "t" of the hub (and a corresponding axial dimension at the relevant rim peripheral surfaces) contributes to the large bearing surface and self-aligning capability of the hub and rim member. This enlarged bearing surface also prevents the rim from wobbling axially or orbiting radially with respect to the hub. In general, it is preferred that the dimension "t" be preferably at least from about 5 to about 200 and more preferably at least from about 10 to about 75 percent of the tip-to-tip distance between the lug members 44 and 46.

As viewed in a plane transverse to the axis of rotation of the torsionally elastic sheave of the invention, as seen in FIG. 4, each of the radial bearing surfaces 50-58, 54-64, 52-60, and 52-62 are arcuate segments. The combined arc length of the segments is preferably from about 40 to about 320 degrees, more preferably from about 120 to about 240 degrees.

As previously mentioned, side thrust loads are accommodated by the overlap of plate 38 with respect to at least the lug portions 44 and 46 of the hub. For the opposite thrust direction, the loads are taken by the interfacial abutment between the flat inner faces of the hub and rim, seen best in the bottom right portion of FIG. 3.

Ears 61 and 63 of the rim member 34 matingly engage with lugs 44 and 46 of the hub through the forward driving resilient cushion spring means 36a (clockwise rotation of the hub relative to the rim) and in the reverse direction through smaller cushions 36b. The cushions which are not serving as the power transmitter for a given direction of rotation do act as reverse bumpers to avoid backlash. In general, the resilient cushion springs 36 may be formed of any desired material although it is highly preferable to use a material which has high damping properties serving to absorb and isolate torsional shocks or vibrations in the power train involved. Most preferred are cushioning means formed of a polymeric preferably elastomeric material compounded to have the desired modulus of elasticity, durometer and other properties to match the particular drive application. Various natural and synthetic rubber materials are especially preferred, e.g., nitrile rubbers which are oil and grease resistant in addition to having desirable damping properties. The cushion blocks 36a, 36b may also be reinforced with fibrous material such as fiber glass or carbon fibers, as required.

The cushioning means are located in cavities defined between the rim, cover face plate (integral with the rim), and hub members. A captive void volume, such as provided by side clearances 66, 68 (FIG. 3) allows the cushions to displace under load. The amount of captive void volume provided, and the stiffness (i.e., modulus) of the blocks will determine the torque/deflection curve and may be modified to fit the particular application.

The materials from which the rim 34 and hub 36 are fabricated may be chosen from a broad range of materials depending upon the severity of the application. An important advantage of the invention, as a result of the large radial bearing surfaces and substantial axial dimension of the hub and rim members, is the ability to reduce material usage by using molded, cast or hollowed out piece parts because of the inherent strength of the design, rather than having to employ solid, heavier parts. For instance, the hub and rim may be molded from a suitable plastic, with or without fiber reinforcement, cast from a suitable metal such as aluminum or iron, machined, or the like. In an especially preferred embodiment, both the hub and rim members are formed of metal stampings which are inherently lightweight and of sufficient strength, and inexpensive to fabricate.

Figure 6:
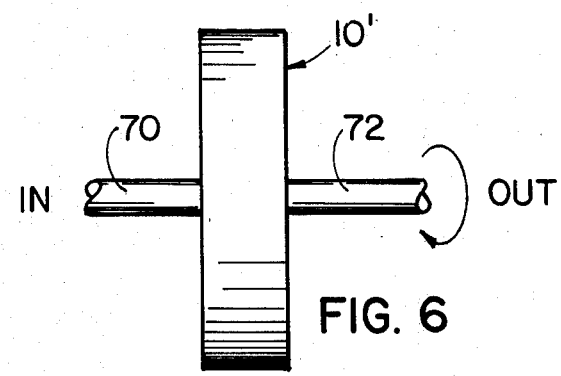
FIG. 6 depicts schematically an alternative application for the device of the invention.

While the invention has been described with respect to belt sheaves, the invention broadly applies to torsionally elastic power transmission assemblies. In FIG. 6, for instance, an alternative application is shown in which the torsionally elastic power transmitting device 10' serves as a flexible coupling between an input shaft 70, subject to vibration and shock loading for example, and an output shaft 72 exhibiting a smoothed torque output.

Figure 7:
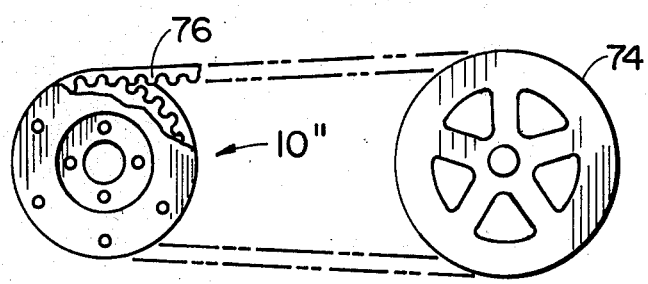
FIG. 7 shows still a further alternative application of the elastic power transmitting device of the invention.

Similarly, in FIG. 7 there is shown an alternative application in which a torsionally ealstic driver sprocket 10" couples a driven sprocket 74 through a toothed, synchronous endless belt 76. A specific application of this type for motorcycle drives is disclosed more fully in the previously referenced U.S. Ser. No. 900,459.

The rim member may also be configured in various other ways to accommodate chain or gear drives, flat belts, etc., according to the given application.

While certain representative embodiments and details have been shown for the purpose of illustrating the invention, it will be apparent to those skilled in the art that various changes and modifications may be made therein without departing from the spirit or scope of the invention.

What is claimed is:

1. In a torsionally elastic power transmitting device rotatable about an axis and having a hub member provided with at least two lugs, and a rim member disposed outwardly of the hub provided with at least two ears matingly engaging the lugs in torsional driving relation through interposed resilient cushion spring means, the improvement comprising:
    the hub and rim members having along their respective outer and inner peripheries a plurality of separate juxtaposed radial bearing surfaces of substantial axial dimension, and in substantial mutual contact, whereby in use the torsionally elastic device has a large radial bearing surface and the hub and rim members self-align.

2. The power transmitting device of claim 1 wherein the radial bearing surfaces are formed on the one hand between the outermost peripheral surface of the lugs and inner peripheral surface of the rim member intermediate adjacent ears, and on the other hand between the innermost peripheral surface of the ears and outer peripheral surface of the hub intermediate adjacent lugs.

3. The power transmitting device of claim 2 wherein each of the radial bearing surfaces are arcuate, as viewed in a plane normal to the axis of the device.

4. The power transmitting device of claim 3 wherein the combined radial bearing surface arc length is from about 40 to about 320 degrees.

5. A torsional vibration dampener comprising:
    a cup-shaped hub member having at least two lugs;
    elastomeric cushion members positioned adjacent the lugs and capable of dampingly transmitting power; and an outer rim member having at least two radially inwardly extending ears adapted to matingly engage the lugs through said cushions interposed therebetween;

said rim and cup-shaped hub members having along their respective inner and outer peripheries radial bearing surfaces which in themselves tend to axially self-align the dampener in use.

6. The dampener of claim 5 wherein the radial bearing surfaces are formed on the one hand between the outermost peripheral surface of the lugs and inner peripheral surface of the rim member intermediate adjacent ears, and on the other hand between the innermost peripheral surface of the ears and outer peripheral surface of the hub intermediate adjacent lugs.

7. The dampener of claim 5 wherein the cup-shaped hub member is comprised of a generally planar inner face and an axially extending flanged peripheral surface a portion of which serves, together with the inner periphery of the rim member, as said radial bearing surfaces.

8. The dampener of claim 5 wherein the rim member is generally cup-shaped, defined by a generally planar inner face and an axially extending inner periphery of which said ears comprise a part thereof.

9. The dampener of claim 8 including a cover face plate rigidly attached to the rim, and having a circumferential flanged marginal pulley portion flattened, grooved or toothed for engaging a power transmission drive member.

* * * * *